United States Patent
Thompson et al.

(10) Patent No.: US 11,396,917 B1
(45) Date of Patent: Jul. 26, 2022

(54) SYSTEM AND METHOD FOR CONTROLLING A CLUTCH PLATE ASSEMBLY OF A VEHICLE

(71) Applicant: Toyota Research Institute, Inc., Los Altos, CA (US)

(72) Inventors: Michael Thompson, San Juan Capistrano, CA (US); Alexander R. Green, Redwood City, CA (US); Yan Ming Jonathan Goh, Palo Alto, CA (US); John Subosits, Menlo Park, CA (US); Avinash Balachandran, Sunnyvale, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 17/215,333

(22) Filed: Mar. 29, 2021

(51) Int. Cl.
*F16D 48/06* (2006.01)
*F16D 48/02* (2006.01)

(52) U.S. Cl.
CPC ...... *F16D 48/066* (2013.01); *F16D 2048/023* (2013.01); *F16D 2048/0221* (2013.01); *F16D 2048/0254* (2013.01); *F16D 2048/0263* (2013.01); *F16D 2500/1027* (2013.01); *F16D 2500/1045* (2013.01); *F16D 2500/10412* (2013.01); *F16D 2500/3101* (2013.01); *F16D 2500/31413* (2013.01); *F16D 2500/5048* (2013.01); *F16D 2500/70406* (2013.01)

(58) Field of Classification Search
None
See application file for complete search history.

(56) References Cited

U.S. PATENT DOCUMENTS

| | | | |
|---|---|---|---|
| 8,702,181 B2 | 4/2014 | Drumm | |
| 8,831,848 B2 | 9/2014 | Lang et al. | |
| 2008/0284242 A1 | 11/2008 | Ganzel | |
| 2010/0259096 A1 | 10/2010 | Rieth et al. | |
| 2010/0298094 A1 | 11/2010 | Oda et al. | |
| 2012/0283901 A1 | 11/2012 | Nagura et al. | |
| 2014/0012474 A1* | 1/2014 | Ruebsam | F16D 27/14 701/68 |
| 2014/0350809 A1* | 11/2014 | Tamaru | B60W 10/06 701/67 |

FOREIGN PATENT DOCUMENTS

| | | | | |
|---|---|---|---|---|
| GB | 1311811 A | * | 3/1973 | ............ F16D 25/14 |
| KR | 0138524 Y1 | * | 4/1999 | |

* cited by examiner

*Primary Examiner* — Timothy Hannon
(74) *Attorney, Agent, or Firm* — Christopher G. Darrow; Darrow Mustafa PC

(57) ABSTRACT

Provided is a system and method for controlling a clutch plate assembly of a vehicle. The system may include a first clutch control system, a second clutch control system, and a valve system. The valve system may have a first input fluidly connected to the first clutch control system for receiving a first pressure from the first clutch control system, a second input configured to be fluidly connected to the second clutch control system for receiving a second pressure from the second clutch control system, and an output configured to be fluidly connected to the clutch plate assembly. The valve system may be configured to provide at least a portion of at least one of the first pressure and the second pressure to the clutch plate assembly.

18 Claims, 5 Drawing Sheets

SYSTEM AND METHOD FOR CONTROLLING A CLUTCH PLATE ASSEMBLY OF A VEHICLE

TECHNICAL FIELD

The subject matter described herein relates, in general, to systems and methods for controlling a clutch plate assembly of a vehicle.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles have manual transmissions where gear changes require the operator to manually select the gears by operating a gear stick and a clutch. Moreover, a flywheel is attached to the engine's crankshaft and rotates at engine speed. A clutch plate assembly sits between the flywheel and a transmission input shaft, controlling whether the transmission is connected to the engine. When the engine is running, and the clutch plate assembly is engaged, the flywheel spins a clutch plate of the clutch plate assembly and provides power to the transmission. When the clutch plate assembly is disengaged, the flywheel cannot spin the clutch plate, and no power is provided to the transmission. While manual transmissions, from an operator standpoint, are more complex to operate, automobile enthusiasts generally prefer this type of system as they feel more connected with the vehicle's operation and/or have more precise control over the operation of the transmission.

The engagement and disengagement of the clutch plate assembly may be performed by the movement of a clutch pedal by the operator of the vehicle. Some vehicles use traditional methodologies that allow power to be transferred from the clutch pedal to the clutch plate assembly using hydraulic or pneumatic power. Generally, this methodology is responsive and provides excellent pedal feedback to the operator of the vehicle, as there is a mechanical link between the clutch pedal and the clutch plate assembly. However, this traditional methodology has some drawbacks, as these systems cannot compensate for situations where the operator engages the clutch too quickly, causing the vehicle to stall.

Newer vehicles may utilize clutch-by-wire control systems that actuate the clutch plate assembly based on the position of the clutch pedal as determined by a clutch pedal sensor. These clutch-by-wire control systems sever the mechanical link between the clutch pedal and the clutch, resulting in a simpler and less expensive system. Additionally, these clutch-by-wire control systems may be integrated with advanced driver assistance systems ("ADAS") to prevent the engine of the vehicle from stalling when one of these systems, such as automatic emergency braking, are actuated. However, clutch-by-wire control systems have drawbacks. For example, because there is no mechanical link between the clutch pedal and the clutch plate assembly, these systems generally provide poor pedal feedback to the operator.

SUMMARY

This section generally summarizes the disclosure and is not a comprehensive explanation of its full scope or all its features.

In one embodiment, a system may include a first clutch control system, a second clutch control system, and a valve system. The valve system may have a first input fluidly connected to the first clutch control system for receiving a first pressure from the first clutch control system, a second input configured to be fluidly connected to the second clutch control system for receiving a second pressure from the second clutch control system, and an output configured to be fluidly connected to the clutch plate assembly. The valve system may be configured to provide at least a portion of at least one of the first pressure and the second pressure to the clutch plate assembly.

In another embodiment, a method for controlling a clutch plate assembly of a vehicle may include the steps of receiving, by a valve system, a first pressure from a first clutch control system and a second pressure from a second clutch control system and providing, via the valve system, at least a portion of at least one of the first pressure and the second pressure to the clutch plate assembly.

In yet another embodiment, a system for controlling a clutch plate assembly of a vehicle may include a clutch-by-wire control system, a mechanical clutch control system, and a shuttle valve. The shuttle valve may have a first input fluidly connected to the clutch-by-wire control system for receiving a first pressure from the clutch-by-wire control system, a second input configured to be fluidly connected to the mechanical clutch control system for receiving a second pressure from the mechanical clutch control system, and an output configured to be fluidly connected to the clutch plate assembly. The shuttle valve is configured to provide at least a portion of at least one of the first pressure and the second pressure to the clutch plate assembly.

In other embodiments, a system or method for controlling the clutch plate assembly of a vehicle may be used with other vehicle control systems, such as ADAS or autonomous vehicle control systems. For example, if the ADAS or autonomous vehicle control system causes the vehicle to suddenly engage the braking system, the system and/or method for controlling the clutch plate assembly may be able to detect when this occurs and engage the clutch plate assembly to prevent the engine from stalling.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described is a system and method for controlling a clutch plate assembly of a vehicle having a manual transmission. The vehicle may utilize two different clutch control systems. In one example, the vehicle may utilize a clutch-by-wire control system and a mechanical clutch control system. Pressure generated by each system is fed into a valve system, which may be a shuttle valve. Whichever system provides the most pressure will be utilized to engage/disengage the clutch plate assembly. This type of system has the advantages in that the clutch-by-wire control system can essentially override the mechanical clutch control system when necessary to prevent the vehicle from stalling and/or allow for smoother clutch plate assembly engagement but also allow the operator of the vehicle to engage/disengage the clutch plate assembly by using the mechanical clutch control system, which provides better responsiveness and feedback to the operator.

Figure 1:
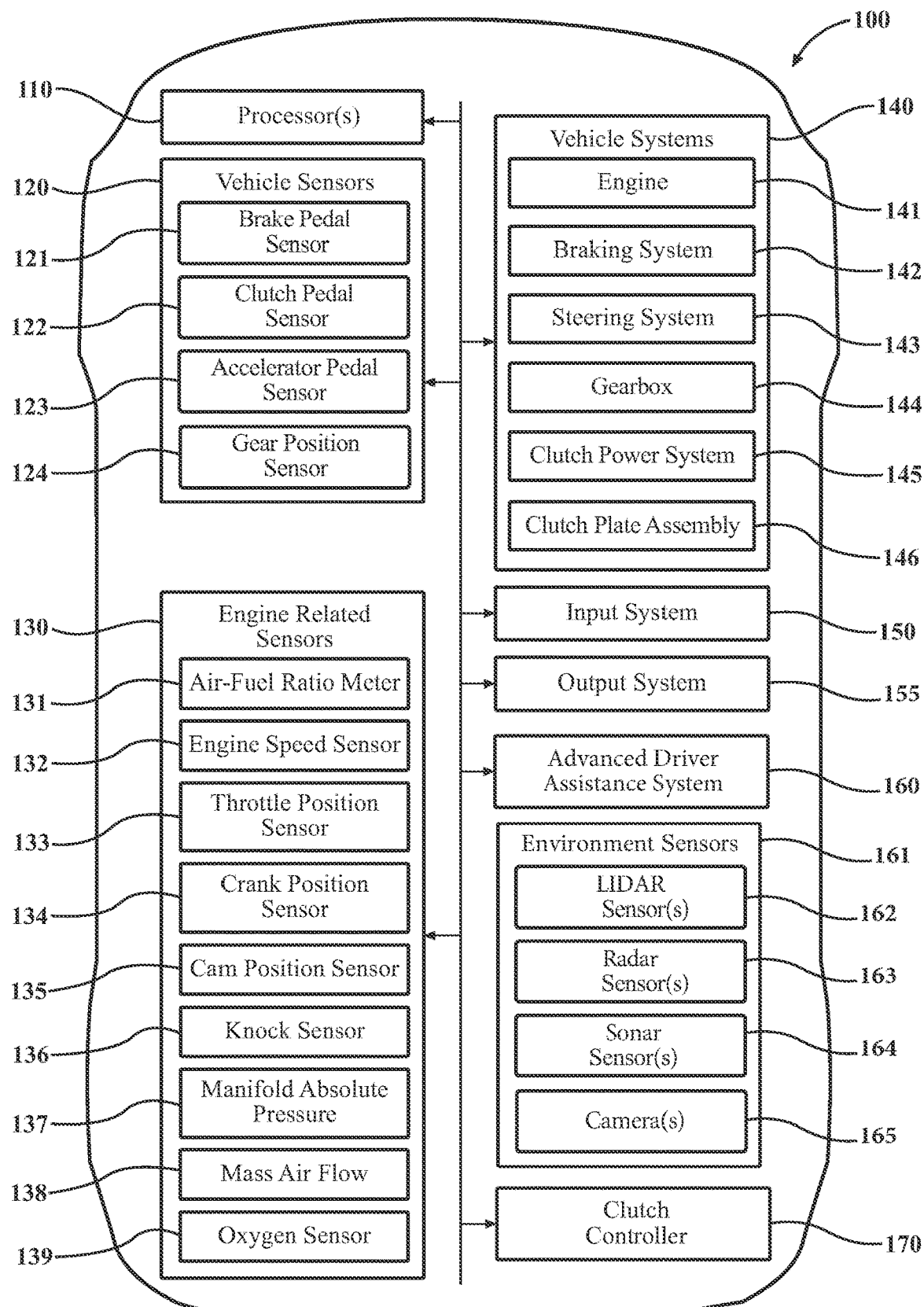
FIG. 1 illustrates a vehicle incorporating a clutch controller.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, could include vehicles such as motorcycles, tractors, trucks, mining vehicles, watercraft, aircraft, military vehicles, and the like.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In one example, the vehicle 100 may include one or more processor(s) 110, one or more vehicle sensors 120, one or more vehicle systems 140, an input system 150, an output system 155, and a clutch controller 170. The processor(s) 110 may communicate with the one or more vehicle sensors 120, one or more vehicle systems 140, the input system 150, the output system 155, and/or the clutch controller 170, to receive information from the systems and/or control the systems.

With regards to the processor(s) 110, the processor(s) 110 may be part of the various systems or may be separate, as shown. The processor may be a single processor or maybe multiple processors working in concert located within different systems and subsystems of the vehicle 100 or even located remotely from the vehicle.

The vehicle sensors 120 may include any one of several different sensors for determining information regarding the vehicle 100, including the operation of the vehicle 100 by an operator, external events affecting the vehicle 100, and/or the overall operation of the vehicle 100. The vehicle sensors 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the vehicle sensors 120 includes a plurality of sensors, the sensors can work independently. Alternatively, two or more of the sensors can work in combination with each other. In such a case, the two or more sensors can form a sensor network. The vehicle sensors 120 and/or the one or more sensors can be operatively connected to the processor(s) 110 and/or another element of the vehicle 100 (including any of the elements shown in FIG. 1). The vehicle sensors 120 can acquire data of at least a portion of the external environment of the vehicle 100 (e.g., nearby vehicles). The vehicle sensors 120 can include any suitable type of sensor. Various examples of different types of sensors will be described herein. However, it will be understood that the embodiments are not limited to the particular sensors described.

In one example, the vehicle sensors 120 include a brake pedal sensor 121, a clutch pedal sensor 122, and/or an accelerator pedal sensor 123. Each of the sensors 121-123 measures one or more physical properties acting upon a brake pedal, a clutch pedal, and/or an accelerator pedal. As such, the sensors 121-123 may measure anyone of a number of different properties, such as the position of the pedals, the force acting upon the pedals, and the overall movement of the pedals, such as the speed in which an operator of the vehicle 100 engages them. The vehicle sensors 120 may also include a gear position sensor 124 that can provide information which gear the vehicle 100 is in.

The vehicle sensors 120 may include a number of engine-related sensors 130. These engine-related sensors measure one or more properties of the engine 141 of the vehicle 100. In some cases, the engine may be an internal combustion engine, including gasoline and diesel-powered engines, but could also be other types of engines as well. Furthermore, the engine 141 could be in the form of one or more electrical motors.

With regards to the engine-related sensors 130, the sensors could include an air-fuel ratio meter 131, an engine speed sensor 132, a throttle position sensor 133, a crank position sensor 134, a cam position sensor 135, a knock sensor 136, a manifold absolute pressure sensor 137, a mass air flow sensor 138 and/or an oxygen sensor 139. It should be understood that the engine-related sensors 130 could include more or fewer sensors than those listed in this paragraph.

The air-fuel ratio meter 131 may monitor the correct air-fuel ratio for the engine 141. The engine speed sensor 132 may monitor the engine speed of the engine 141. The throttle position sensor 133 may monitor the position of the throttle and the engine 141. The crank position sensor 134 monitors one or more of the piston's top dead center position in the engine 141. The cam position sensor 135 may monitor the position of the valves in the engine 141. The knock sensor 136 detects engine knocking in the engine 141 because of timing advance. The manifold absolute pressure sensor 137 may be used to regulate fuel metering. The mass air flow sensor 138 may measure the mass of air entering the engine 141. The oxygen sensor 139 may monitor the amount of oxygen in the exhaust of the vehicle 100.

Generally, the engine-related sensors 130 can be utilized to determine anyone of a number of conditions or issues with the engine 141 of the vehicle 100. For example, information generated by the engine-related sensors 130 can be used by the processor(s) 110 to determine if the engine 141 of the vehicle 100 is in the process of stalling. The stalling of an engine may occur due to a number of different circumstances, including the engine 141 not getting enough air, energy, fuel, and electric spark, as well as fuel starvation, mechanical failure, and/or in response to a sudden increase in engine load.

A sudden increase in engine load can occur in a number of different situations. For example, if a clutch plate assembly 146 of the vehicle 100 is engaged too quickly, the sudden increase in engine load may cause the engine 141 to begin stalling. This may also occur in situations where the clutch is engaged, and the brakes of the vehicle 100 are being applied, thus increasing the engine load, which may cause the engine 141 to begin stalling. For example, if the vehicle 100 has one or more active safety systems, such as automatic emergency braking, these active safety systems may cause the vehicle 100 to suddenly begin braking, greatly increasing the engine load if the clutch plate assembly 146 is not disengaged, causing the engine 141 of the vehicle to stall. This type of situation, especially if it is an emergency, can create a dangerous situation for the occupants of the vehicle 100, as the engine 141 will need to be restarted.

The vehicle systems 140 can include anyone of a number of different vehicle systems for the vehicle 100. In this example, the vehicle systems 140 include an engine 141, which as explained previously, can be any type of engine, such as an internal combustion engine but could also be one or more electrical motors. The vehicle systems 140 may include a braking system 142 for braking the vehicle 100 and a steering system 143 for steering the vehicle 100. The vehicle systems 140 may also include transmission-related systems, such as a gearbox 144, a clutch power system 145, and a clutch plate assembly 146.

The gearbox 144 may be a gearbox for a manual transmission that may include a number of interlocking gear wheels. Depending on the position of the interlocking gear wheels, different ratios between an input shaft and an output shaft output can be generated. The repositioning of these interlocking gear wheels may be caused by the movement of the gear stick or other input device actuated by the operator of the vehicle 100. The interlocking gear wheels may include any one of a number of interlocking gear wheels to allow for any one of a number of different gear positions. For example, the gearbox 144 may have seven positions, wherein six of the positions are different ratios in one direction, while one of the positions, which may be referred to as a reverse position, may have one ratio for allowing the movement of the vehicle 100 in a reverse direction.

The clutch power system 145, which will be described in more detail in FIG. 3, can actuate the clutch plate assembly 146, which allows the clutch to disengage/engage the engine 141. When the clutch plate assembly 146 is engaged, power will be transferred from the engine 141 to the gearbox 144. When the clutch plate assembly 146 is disengaged, power will not be transferred from the engine 141 to the gearbox 144. The clutch plate assembly 146, which will also be described in more detail in FIG. 3, may include one or more clutch discs that can be selectively moved by the clutch power system 145 to engage/disengage the engine 141 from the gearbox 144.

The vehicle 100 may also include an input system 150 and an output system 155. An "input system" includes any device, component, system, element or arrangement, or groups that enable information/data to be entered into a machine. In one example, input system 150 may include the gear stick for adjusting the gears of the gearbox 144. The input system 150 can receive an input from a vehicle passenger (e.g., an operator or a passenger). The vehicle 100 can include an output system 155. An "output system" includes any device, component, or arrangement, or groups thereof that enable information/data to be presented to a vehicle passenger (e.g., an operator or a passenger).

The vehicle 100 also includes a clutch controller 170, as shown. As will be explained in more detail in the paragraphs that follow and in FIG. 3, the clutch controller 170 may negotiate and/or control the engagement of the clutch plate assembly 146 between two different clutch control systems. In one example, the vehicle 100 may utilize a clutch-by-wire control system and a mechanical clutch control system. Pressure generated by each system is fed into a valve system, which may be a shuttle valve. Whichever pressure is greater will be provided to the clutch plate assembly 146. This type of system has the advantages in that the clutch-by-wire control system can essentially override the mechanical clutch control system when necessary to prevent the vehicle from stalling and/or allow for smoother clutch engagement but also allow the operator the vehicle to engage/disengage the clutch by using the mechanical clutch control system, which provides better responsiveness and feedback to the operator.

Figure 2:
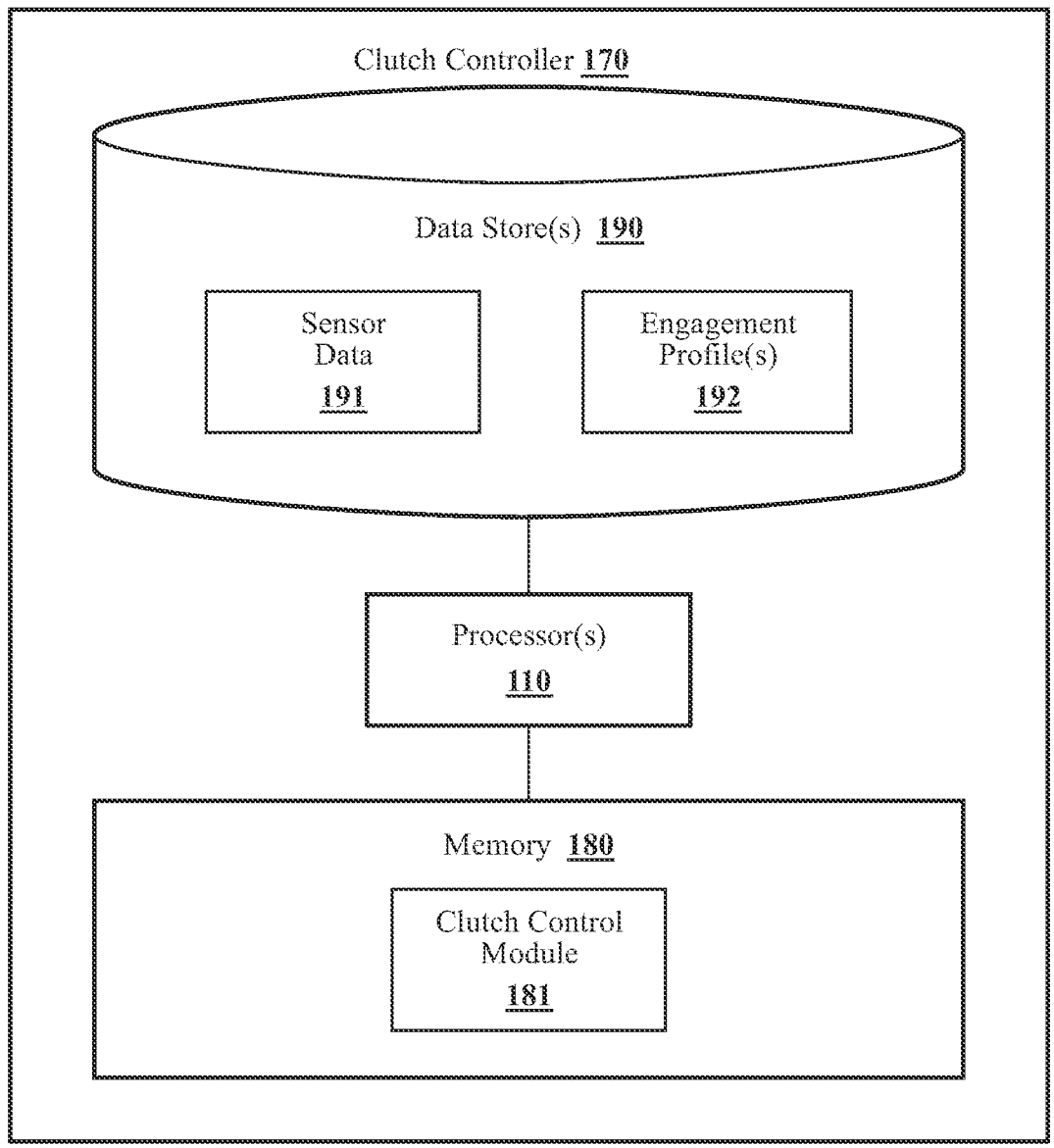
FIG. 2 illustrates a more detailed view of the clutch controller.

With reference to FIG. 2, one embodiment of the clutch controller 170 is further illustrated. As shown, the clutch controller 170 includes the processor(s) 110. Accordingly, the processor(s) 110 may be a part of the clutch controller 170, or the clutch controller 170 may access the processor(s) 110 through a data bus or another communication path. In one or more embodiments, the processor(s) 110 is an application-specific integrated circuit that is configured to implement functions associated with a clutch control module 181. In general, the processor(s) 110 is an electronic processor such as a microprocessor capable of performing various functions as described herein. In one embodiment, the clutch controller 170 includes a memory 180 that stores the clutch control module 181. The memory 180 may be a random-access memory (RAM), read-only memory (ROM), a hard disk drive, a flash memory, or other suitable memory for storing the clutch control module 181. The clutch control module 181 is, for example, computer-readable instructions that, when executed by the processor(s) 110, cause the processor(s) 110 to perform the various functions disclosed herein.

The clutch control module 181 can be implemented as computer-readable program code that, when executed by a processor(s) 110, implement one or more of the various processes described herein. The clutch control module 181 can be a component of the processor(s) 110 or can be executed on and/or distributed among other processing systems to which the processor(s) 110 is operatively connected. The clutch control module 181 can include instructions (e.g., program logic) executable by one or more processor(s) 110. In one or more arrangements, the clutch control module 181 described herein can include artificial or computational intelligence elements, e.g., neural network, fuzzy logic, or other machine learning algorithms.

In one embodiment, the clutch controller 170 includes a data store(s) 190. The data store(s) 190 is, in one embodiment, an electronic data structure such as a database that is stored in the memory 180 or another memory and that is configured with routines that can be executed by the processor(s) 110 for analyzing stored data, providing stored data, organizing stored data, and so on. Thus, in one embodiment, the data store(s) 190 stores data used and/or generated by the clutch control module 181 in executing various functions. In one embodiment, the data store(s) 190 includes sensor data 191 and one or more engagement profile(s) 192, along with, for example, other information that is used and/or generated by the clutch control module 181. The sensor data 191 may include data collected from any one of the vehicle sensors 120. The engagement profile(s) 192 may include one or more performance selections regarding an engagement profile indicating a speed range of engagement of the clutch plate assembly 146. The use of the engagement profile(s) 192 will be described later in this specification.

Figure 3:
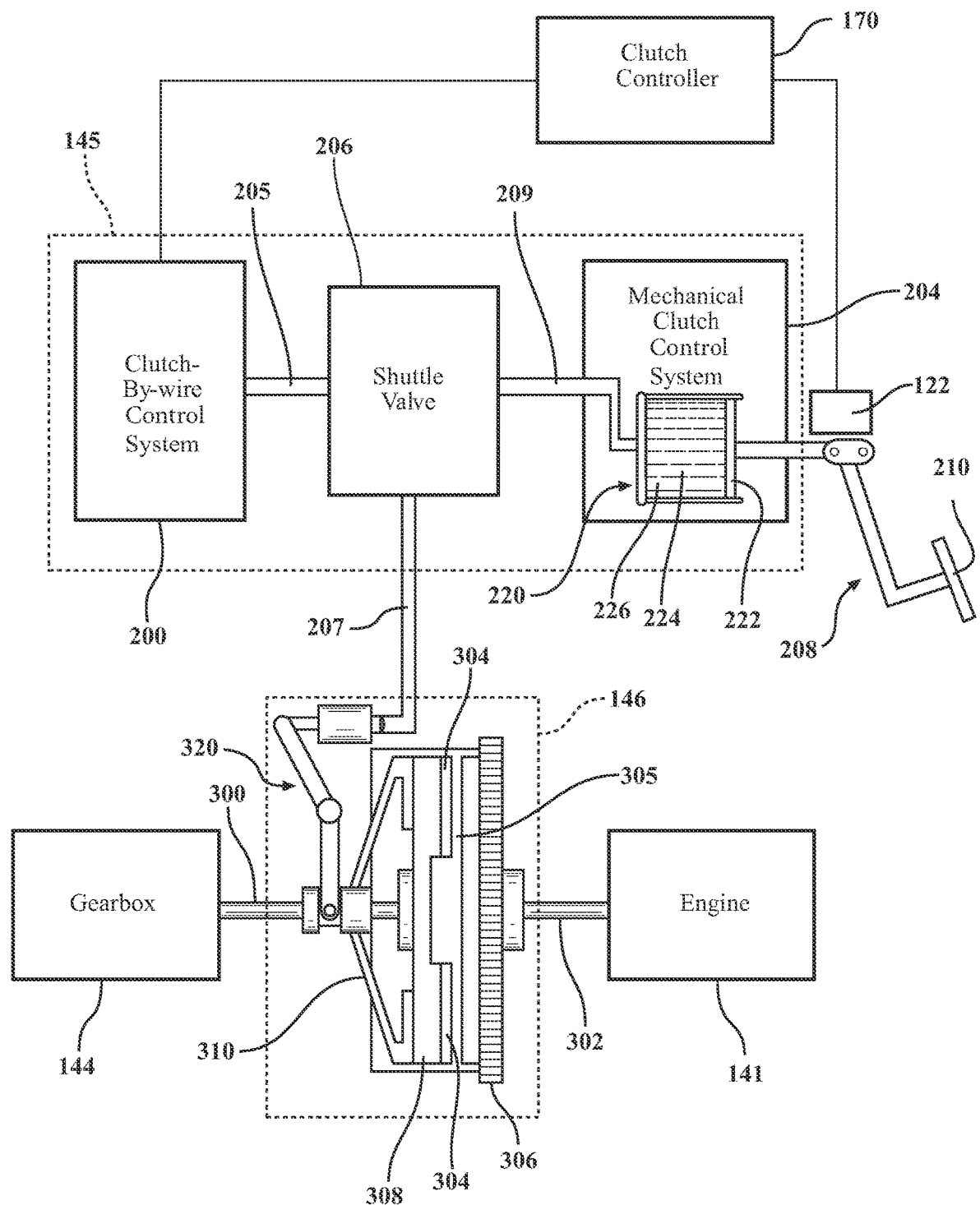
FIG. 3 illustrates the clutch controller of FIG. 2 being used to control a clutch plate assembly.

FIG. 3 illustrates more detailed views of the clutch power system 145 and the clutch plate assembly 146 as it interacts with the engine 141 and the gearbox 144. Regarding the clutch power system 145, the clutch power system 145 includes two different types of clutch control systems. In this example, the clutch power system 145 includes a clutch-by-wire control system 200 and a mechanical clutch control system 204. The clutch-by-wire control system 200 may be a clutch control system that provides a pneumatic or hydraulic pressure to the clutch plate assembly 146 via a valve system, which may be a shuttle valve 206. The shuttle valve 206 may be a single shuttle valve or multiple shuttle valves. The clutch-by-wire control system 200 may be a system that determines how much pressure to be provided either hydraulically or pneumatically to the clutch plate assembly 146 by monitoring the movement of the clutch pedal sensor 122.

Also illustrated is a clutch pedal assembly 208 that includes a clutch pedal 210 that an operator of the vehicle 100 may operate. Here, the clutch pedal sensor 122 can monitor the position, movement, and other forces acting upon the clutch pedal assembly 208. Using this information, the clutch-by-wire control system 200 may provide an appropriate pressure to the clutch plate assembly 146 via the shuttle valve 206.

However, as stated previously, the clutch power system 145 includes at least one other clutch control system. In this example, the other clutch control system is a mechanical clutch control system 204. The mechanical clutch control system 204 includes a master cylinder 220 that includes a piston 222 that acts upon a chamber 224 filled with a gas or liquid 226. The piston 222 is in mechanical communication with the clutch pedal assembly 208 and, as the clutch pedal assembly 208 moves, the piston 222 converts the mechanical force acting upon the clutch pedal 210 into a hydraulic or pneumatic force (i.e., pressure) that is provided to the shuttle valve 206 by the line 209.

As stated before, the clutch power system 145 includes a valve system, which may be a shuttle valve 206. If the valve system is a shuttle valve 206, the shuttle valve 206 is fluidly connected to the clutch-by-wire control system 200 and the mechanical clutch control system 204 by lines 205 and 209, respectively. The shuttle valve 206 may include two inputs. In this example, the shuttle valve 206 has one input connected to the line 205 and another input connected to the line 209. The pressure from the line providing the greatest pressure will be provided to the output line 207 of the shuttle valve 206. If the clutch-by-wire control system 200 generates the greatest pressure, the pressure, or at least a portion thereof, generated by the clutch-by-wire control system 200 will be provided to the output line 207. Conversely, if the mechanical clutch control system 204 generates a greater pressure, at least a portion of the pressure generated by the mechanical clutch control system 204 will be provided to the output line 207.

The valve system may be a shuttle valve 206, as shown, but it could also be any other type of system for providing hydraulic or pneumatic pressure to an output line from two different sources, with the source providing the greater pressure being fluidly connected to the output line. For example, the valve system may be a smart valve that has two inputs and an output. The smart valve could electronically measure the pressure provided to each of the inputs using pressure sensors. The smart valve could include a processor that can determine which input provides the greatest pressure based on information from the pressure sensors and then mechanically adjust the smart valve such that the input that provides the greatest pressure is fluidly connected to the output.

The clutch plate assembly 146 may be connected to an output shaft 302 of the engine 141 and an input shaft 300 of the gearbox 144. When the clutch plate assembly 146 is engaged, power from the engine 141 provided to the output shaft 302 will be transferred to the input shaft 300 of the gearbox 144. From the gearbox 144, the gear ratio may be changed, and power is provided to one or more wheels of the vehicle 100 either directly or indirectly by one or more intermediary components, such as a differential.

The clutch plate assembly 146 can be any type of clutch plate assembly that can engage and disengage power from an engine 141 to a gearbox 144. As such, it should be understood that the example of the clutch plate assembly 146 of FIG. 3 is merely an example and that the clutch plate assembly 146 may take a number of different forms.

In this example, the clutch plate assembly 146 includes a flywheel 306 that is mechanically connected to the output shaft 302. As such, when the engine 141 is providing power to the output shaft 302, the flywheel 306 rotates. Located adjacent to the flywheel 306, opposite the output shaft 302 is a clutch disc 304 and a clutch plate 308. The clutch disc 304 is layered on top of at least a portion of the clutch plate 308. A spring diaphragm 310 is attached to the clutch plate 308, opposite the clutch disc 304.

An arm system 320 is attached to the spring diaphragm 310. The arm system 320 receives pressure from the output line 207 from the shuttle valve 206. Pressure received from the output line 207 is converted into a mechanical force by the arm system 320. The arm system 320 actuates the spring diaphragm 310, such that the spring diaphragm 310 causes the movement of the clutch plate 308 and the clutch disc 304. As shown in this figure, the clutch disc 304 is not directly in contact with the flywheel 306, as illustrated by a cavity 305. Generally, this may occur when the clutch plate assembly 146 is disengaged, such that power will not be transferred from the engine to the gearbox. The situation generally occurs when enough pressure is provided by the output line 207 to the arm system 320. The presence of an appropriate pressure causes the arm system 320 to move the clutch plate 308 and the clutch disc 304 away from the flywheel 306, thus preventing a transfer of power from the engine 141 to the gearbox 144.

Conversely, if pressure is removed from the output line 207, the arm system 320 relaxes its control of the spring diaphragm 310 and allows the clutch plate 308 and the clutch disc 304 to come into contact with the flywheel 306. When this occurs, power is transferred from the output shaft 302 of the engine 141 to the input shaft 300 of the gearbox 144.

As such, the engagement and disengagement of the clutch plate assembly 146 occurs when there is a change in pressure provided by the shuttle valve 206 to the output line 207. As stated before, the shuttle valve 206 transfers at least a portion of the pressure received from either the clutch-by-wire control system 200 or the mechanical clutch control system 204. The clutch control module 181 may include instructions that cause the processor(s) 110 to instruct the clutch-by-wire control system 200 how much pressure it should provide to the shuttle valve 206.

By adjusting how much pressure the clutch-by-wire control system 200 provides the shuttle valve 206, the clutch control module 181 can cause the processor(s) 110 to override the pressure provided by the mechanical clutch control system 204 by providing a pressure greater than that provided by the mechanical clutch control system 204. Conversely, the clutch control module 181 can also cause the processor(s) 110 to cede control to the mechanical clutch control system 204 by instructing the clutch-by-wire control system 200 to produce a pressure that is less than the pressure being generated by the mechanical clutch control system 204 or simply refrain from producing a pressure.

Some operators may prefer controlling the engagement and disengagement of the clutch plate assembly 146 using the mechanical clutch control system 204. In some cases, this preference may be explained because there is a direct physical link between the mechanical clutch control system 204 and the clutch plate assembly 146, which provides better feedback to the clutch pedal 210. In these types of situations, the clutch control module 181 may cause the processor(s) 110 to instruct the clutch-by-wire control system 200 to produce a pressure or, in the alternative, avoid actively generating any pressure that is greater than a pressure generated by the mechanical clutch control system 204. By so doing, the mechanical clutch control system 204 directly controls the clutch plate assembly 146.

However, there may be situations where having the clutch-by-wire control system 200 control the clutch plate assembly 146 is advantageous. In one example, the clutch control module 181 may include instructions that, when executed by the processor(s) 110, utilize one or more engagement profile(s) 192 that, as previously mentioned, may be stored in the data store(s) 190. The engagement profile(s) 192 may generally describe how quickly the clutch plate assembly 146 should be engaged or disengaged in the form of a speed range. For example, skilled operators generally smoothly engage and disengage the clutch plate assembly 146. As such, in some cases, the engagement profile(s) 192 may indicate a speed range indicating a range describing how quickly/slowly the clutch plate assembly 146 should be engaged/disengaged.

As such, the clutch control module 181 may include instructions that, when executed by the processor(s) 110, may determine how quickly/slowly an operator is engaging/disengaging the clutch plate assembly 146 by receiving information from the clutch pedal sensor 122. As explained previously, the clutch pedal since 122 can determine the position movement of the clutch pedal assembly 208 by an operator.

In situations where the speed of the movement of the clutch pedal 210 of the clutch pedal assembly 208 is outside the speed range indicated by the engagement profile(s) 192, the clutch-by-wire control system 200 may be instructed by the processor(s) 110 to produce a pressure greater than that of the mechanical clutch control system 204. This may be advantageous in situations where the operator of the vehicle 100 is engaging the clutch pedal 210 too rapidly, causing an increased load on the engine 141 due to the rapid engagement of the clutch plate assembly 146 in response to the movement of the clutch pedal 210, which may cause the engine 141 to stall and/or causes a jerking of the vehicle 100. In these situations, the clutch control module 181 may cause the processor(s) 110 to monitor the movement of the clutch pedal 210 by using information from the clutch pedal since 122. If it is determined that the movement of the clutch pedal is outside the speed range, or greater than the speed range, the clutch control module 181 may cause the processor(s) 110 to instruct the clutch-by-wire control system 200 to produce a pressure to prevent this rapid engagement of the clutch plate assembly 146. By producing a pressure greater than the mechanical clutch control system 204, the clutch-by-wire control system 200 is essentially overriding the engagement of the clutch plate assembly 146 by the mechanical clutch control system 204. By so doing, the clutch-by-wire control system 200 can more slowly engage the clutch plate assembly 146 such that the engagement is within the speed range, making for a smoother engagement of the clutch plate assembly 146.

The clutch control module 181 may also include instructions that, when executed by the processor(s) 110, cause the processor(s) 110 to determine if the engine 141 is in the process of stalling. The process of stalling may include any period of time before the engine 141 completely stalls and stops running. Moreover, the clutch control module 181 may cause the processor(s) 110 to receive information from the engine-related sensors 130. Using this information from the engine-related sensors 130, the clutch control module 181 may cause the processor(s) 110 to determine that the engine 141 is in the process of stalling.

In cases where the engine 141 is in the process of stalling, the clutch control module 181 may cause the processor(s) 110 to instruct the clutch-by-wire control system 200 to produce a pressure greater than that being provided by the mechanical clutch control system 204 to disengage the clutch plate assembly 146. In one example, the engine 141 may be in the process of stalling because an additional load has been placed on the engine 141 unexpectedly. In some cases, if the braking system 142 of the vehicle 100 causes the vehicle 100 to slow down, an unexpected load is applied to the engine 141, potentially causing the engine 141 to stall. Stalling of the engine 141 can be avoided if the clutch plate assembly 146 is timely disengaged, thus removing the load from the engine 141. This may occur in situations where the operator of the vehicle 100 rapidly applies the brakes of the vehicle 100 and/or in situations where an ADAS, semi-autonomous control system, or autonomous control system determines that the vehicle 100 should have its brakes applied to prevent a collision or avoid some other situation.

Because the clutch control module 181 causes the processor(s) 110 to determine when the engine 141 is in the process of stalling, a situation can be avoided where an operator and/or active safety system rapidly applies the brakes of the vehicle 100 causing the engine 141 to stall. By preventing the engine 141 from stalling, the operator of the vehicle 100 can quickly move the vehicle 100 if necessary without having to restart the vehicle 100 altogether.

As such, the vehicle 100 may include a driver assistance system, such as ADAS 160. The ADAS 160 may be one or more electronic systems that assist the operator with driving and/or parking the vehicle 100. The ADAS 160 may use information from one or more environment sensors 161. These environment sensors 161 collect information regarding the environment surrounding the vehicle 100. In one example, the environment sensors 161 may include one or more LIDAR sensor(s) 162, one or more radar sensor(s) 163, one or more sonar sensor(s) 164, and/or one or more camera(s) 165. It should be understood that the sensors mentioned above forming the environment sensors 161 are merely examples of the type of sensors that may be utilized by the ADAS 160. Other or alternative types of sensors may also be utilized and should not be limited to just those specifically mentioned above.

The ADAS 160 may include one or more systems for controlling the vehicle 100 such as adaptive cruise control, emergency brake assist, automatic emergency braking, lane-keeping, rear cross traffic monitoring, lane centering, and the like. Again, it should be understood that these are just examples of some of the systems that may form the ADAS 160. Other or alternative systems may also be included as part of ADAS 160. For example, ADAS 160 or a separate autonomous vehicle control system, may be able to control the clutch control module 181 and the gearbox 144 allowing the vehicle 100 to be operated in autonomous driving mode.

In some situations, the ADAS 160 may control one or more of the vehicle systems 140, such as the braking system 142 and/or the steering system 143. For example, if the ADAS 160 determines based on information from the environment sensors 161 that a collision may be imminent, the ADAS 160 may cause the braking system 142 to actuate one or more brakes of the vehicle 100 to avoid or minimize damage from the impending collision. This braking may cause an increased load on the engine 141 causing the engine to stall. The clutch controller 170 may be configured to detect when the engine 141 is in the process of stalling and engage the clutch-by-wire control system 200 to prevent the engine 141 from stalling.

As such, the clutch controller 170 provides several advantages over prior art systems. Moreover, the clutch controller 170 generally allows the mechanical clutch control system 204 to engage/disengage the clutch plate assembly 146 under most circumstances. However, in circumstances where the engine 141 is in the process of stalling or circumstances where the operator of the vehicle 100 engages the clutch plate assembly 146 rapidly and outside a preferred engagement window, the clutch controller 170 can control the clutch-by-wire control system 200 to provide the appropriate pressure to control the clutch plate assembly 146 to prevent stalling of the engine 141 and/or provide a smoother engagement of the clutch plate assembly 146. It should be understood that these advantages described in this paragraph and elsewhere in this description are only a listing of some of the advantages and not all the advantages that the clutch controller 170 provides.

Figure 4:
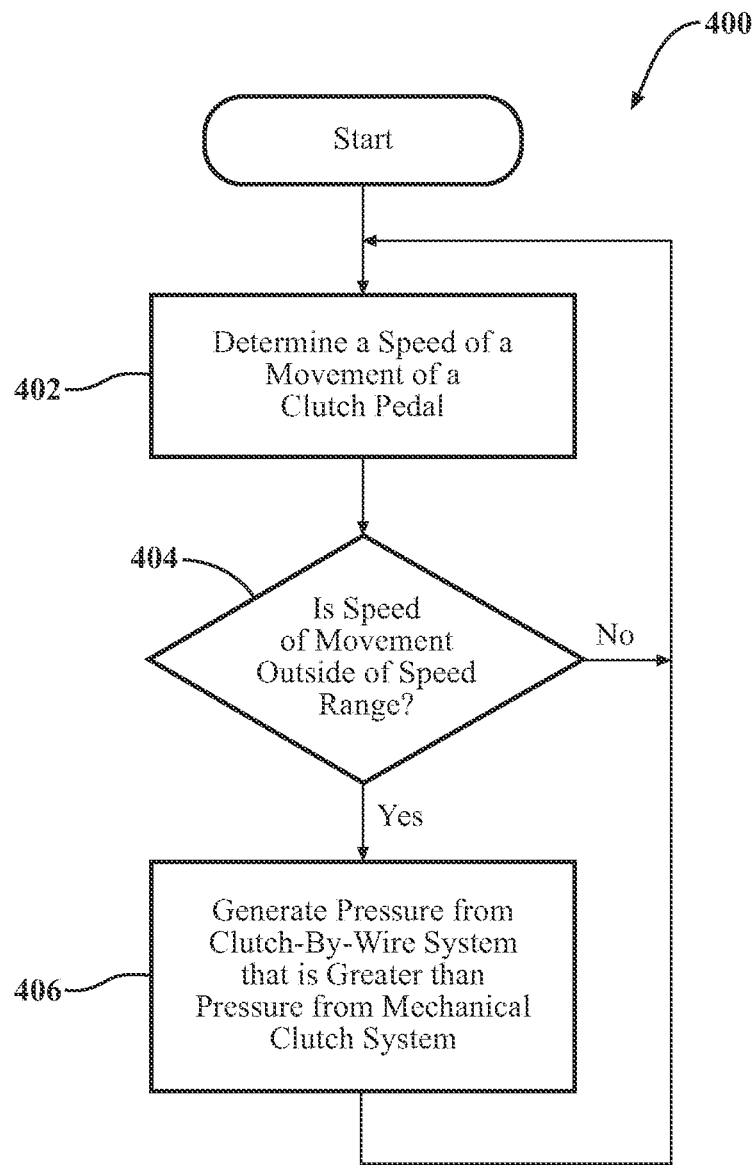
FIG. 4 illustrates a method for controlling a clutch plate assembly by a clutch controller using an engagement profile.

Referring to FIG. 4, a method 400 for controlling a clutch plate assembly using one or more engagement profile(s). The method 400 will be described from the viewpoint of the vehicle 100 of FIG. 1 and the clutch controller 170 of FIGS. 2 and 3. However, it should be understood that this is just one example of implementing the method 400. While the method 400 is discussed in combination with the clutch controller 170, it should be appreciated that the method 400 is not limited to being implemented within the clutch controller 170 but is instead one example of a system that may implement the method 400.

In step 402, the clutch control module 181 may cause the processor(s) 110 to receive information from the clutch pedal sensor 122. As stated before, the clutch pedal sensor 122 can measure the position, movement, and/or other forces acting upon the clutch pedal 210. Using this information, the clutch control module 181 may cause the processor(s) 110 to determine the overall speed of the engagement of the clutch pedal 210 by the operator of the vehicle 100.

In step 404, the clutch control module 181 evaluate this information from the clutch pedal sensor 122 to determine may cause the processor(s) 110 to determine if the overall speed of the engagement of clutch pedal 210 by the operator of the vehicle is outside a speed range or speed limit that may be stored as one or more engagement profile(s) 192 in the data store(s) 190. If the overall speed of the engagement of the clutch pedal 210 is within the speed range or below a speed limit, the method 400 returns to step 402.

However, if the speed of the movement of the engagement of the clutch pedal 210 is outside the speed range, the method 400 proceeds to step 406. In step 406, the clutch control module 181 may cause the processor(s) 110 to generate pressure from the clutch-by-wire control system 200 that is greater than the pressure from the mechanical clutch control system 204. This may be advantageous in situations where the operator of the vehicle 100 is engaging the clutch plate assembly 146 too rapidly, causing an increased load on the engine 141, which may cause the engine 141 to stall and/or cause unnecessary jerking of the vehicle 100.

Figure 5:
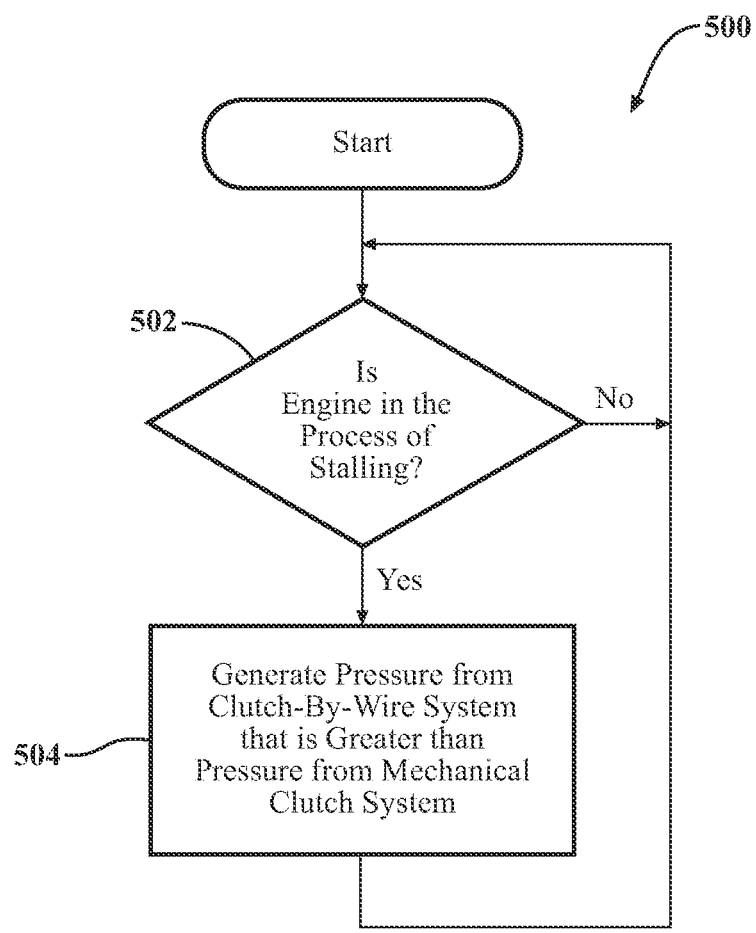
FIG. 5 illustrates a method for controlling a clutch plate assembly system by a clutch controller when an engine is in the process of stalling.

Referring to FIG. 5, a method 500 for controlling a clutch plate assembly when a vehicle is in the process of stalling. The method 500 will be described from the viewpoint of the vehicle 100 of FIG. 1 and the clutch controller 170 of FIGS. 2 and 3. However, it should be understood that this is just one example of implementing the method 500. While method 500 is discussed in combination with the clutch controller 170, it should be appreciated that the method 500 is not limited to being implemented within the clutch controller 170 but is instead one example of a system that may implement the method 500.

In step 502, the clutch control module 181 may cause the processor(s) 110 to determine if the engine 141 of the vehicle 100 is in the process of stalling. The process of stalling may include any period of time before the engine 141 completely stalls and stops running. Moreover, the clutch control module 181 may cause the processor(s) 110 to receive information from the engine-related sensors 130. Using this information from the engine-related sensors 130, the clutch control module 181 may cause the processor(s) 110 to determine that the engine 141 is in the process of stalling. Stalling may occur for a number of different reasons but could be caused by an increased load on the engine 141. This may include situations where the brakes of the vehicle 100 are suddenly applied, such as in an emergency by the operator or by an advanced driver assistance system, semi-autonomous system, or autonomous vehicle system to prevent a vehicle collision.

If it is determined that the engine 141 is not in the process of stalling, the method 500 returns to step 502. Conversely, if it is determined that the engine 141 is in the process of stalling, the method 500 proceeds to step 504. In step 504, the clutch control module 181 may cause the processor(s)

110 to instruct the clutch-by-wire control system 200 to produce a pressure greater than that being provided by the mechanical clutch control system 204, to disengage the clutch plate assembly 146. In one example, the engine 141 may be in the process of stalling because an additional load has been placed on the engine 141 unexpectedly. In some cases, if the braking system 142 of the vehicle 100 causes the vehicle 100 to slow down, an unexpected load is applied to the engine 141, potentially causing the engine 141 to stall. Thereafter, the method 500 either ends or begins again and returns to step 502.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

According to various embodiments, the flowcharts and block diagrams in the figures illustrate the architecture, functionality, and operation of possible implementations of systems, methods, and computer program products. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In this document's context, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the terms "a" and "an" are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof.

Accordingly, reference should be made to the following claims, rather than to the foregoing specification, as indicating the scope hereof.

What is claimed is:

1. A system for controlling a clutch plate assembly of a vehicle comprising:
   a processor;
   a first clutch control system;
   a second clutch control system being controlled by a clutch pedal;
   a valve system having a first input fluidly connected to the first clutch control system for receiving a first pressure from the first clutch control system, a second input configured to be fluidly connected to the second clutch control system for receiving a second pressure from the second clutch control system, and an output configured to be fluidly connected to the clutch plate assembly;
   the valve system being configured to provide, via the output, at least a portion of at least one of the first pressure and the second pressure to the clutch plate assembly; and
   a memory in communication with the processor and having a clutch control module, the clutch control module having instructions that, when executed by the processor, causes the processor to instruct the first clutch control system to generate the first pressure such that the first pressure is greater than the second pressure when a movement speed of the clutch pedal is outside a predetermined speed range.

2. The system of claim 1, wherein the valve system is a shuttle valve.

3. The system of claim 1, wherein the valve system is configured to provide at least the portion of the first pressure to the clutch plate assembly when the first pressure is greater than the second pressure and provide at least the portion of the second pressure to the clutch plate assembly when the second pressure is greater than the first pressure.

4. The system of claim 1,
   wherein the first clutch control system is a clutch-by-wire control system.

5. The system of claim 4, wherein the second clutch control system is a mechanical clutch control system configured to generate the second pressure based on a movement of the clutch pedal, wherein the second pressure is generated when the movement of the clutch pedal mechanically changes a master cylinder pressure of a master cylinder of the mechanical clutch control system.

6. The system of claim 5, wherein the clutch control module further includes instructions that, when executed by the processor, cause the processor to receive a performance selection regarding an engagement profile indicating the speed range of engagement of the clutch plate assembly and adjust the first pressure generated by the clutch-by-wire control system based on the engagement profile.

7. The system of claim 5, wherein the clutch control module further includes instructions that, when executed by the processor, cause the processor to instruct the clutch-by-wire control system to generate the first pressure such that the first pressure is greater than the second pressure when at least one of:
   an engine of the vehicle is in a process of stalling,
   an advanced driver assistance system applies one or more brakes of the vehicle, and
   the vehicle is being operated in an autonomous mode.

8. A method for controlling a clutch plate assembly of a vehicle comprising the steps of:
   receiving, by a valve system, a first pressure from a first clutch control system and a second pressure from a, the second clutch control system being controlled by a clutch pedal;
   providing, via the valve system, at least a portion of at least one of the first pressure and the second pressure to the clutch plate assembly; and
   generating the first pressure by the first clutch control system to be greater than the second pressure when a movement speed of the clutch pedal is outside a predetermined speed range.

9. The method of claim 8, wherein the valve system is a shuttle valve.

10. The method of claim 8, further comprising the steps of:
    providing, via the valve system, at least the portion of the first pressure to the clutch plate assembly when the first pressure is greater than the second pressure; and
    providing, via the valve system, at least the portion of the second pressure to the clutch plate assembly when the second pressure is greater than the first pressure.

11. The method of claim 8, wherein the first clutch control system is a clutch-by-wire control system.

12. The method of claim 11, wherein the second clutch control system is a mechanical clutch control system.

13. The method of claim 12, further comprising the steps of:
    generating, by the clutch-by-wire control system, the first pressure based on a movement of a clutch pedal by an operator of the vehicle as detected by a clutch sensor; and
    generating, by the mechanical clutch control system, the second pressure based on the movement of the clutch pedal, wherein the second pressure is generated when the movement of the clutch pedal mechanically changes a master cylinder pressure.

14. The method of claim 12, further comprising the steps of:
    receiving a performance selection regarding an engagement profile indicating the speed range of engagement of the clutch plate assembly; and
    adjusting the first pressure generated by the clutch-by-wire control system based on the engagement profile.

15. The method of claim 12, further comprising the steps of generating the first pressure by the clutch-by-wire control system such that the first pressure is greater than the second pressure when at least one of:
    an engine of the vehicle is in a process of stalling,
    an advanced driver assistance system applies one or more brakes of the vehicle, and
    the vehicle is being operated in an autonomous mode.

16. A system for controlling a clutch plate assembly of a vehicle comprising:
    a processor;
    a clutch-by-wire control system;
    a mechanical clutch control system being controlled by a clutch pedal;
    a shuttle valve having a first input fluidly connected to the clutch-by-wire control system for receiving a first pressure from the clutch-by-wire control system, a second input configured to be fluidly connected to the mechanical clutch control system for receiving a second pressure from the mechanical clutch control system, and an output configured to be fluidly connected to the clutch plate assembly;

the shuttle valve being configured to provide, via the output, at least a portion of at least one of the first pressure and the second pressure to the clutch plate assembly; and a memory in communication with the processor and having a clutch control module, the clutch control module having instructions that, when executed by the processor, causes the processor to instruct the clutch-by-wire control system to generate the first pressure such that the first pressure is greater than the second pressure when a movement speed of the clutch pedal is outside a predetermined speed range.

17. The system of claim 16, wherein the shuttle valve is configured to provide at least the portion of the first pressure to the clutch plate assembly when the first pressure is greater than the second pressure and provide at least the portion of the second pressure to the clutch plate assembly when the second pressure is greater than the first pressure.

18. The system of claim 17, wherein the clutch-by-wire control system is configured to generate the first pressure such that the first pressure is greater than the second pressure when at least one of:

an engine of the vehicle is in a process of stalling,
an advanced driver assistance system applies one or more brakes of the vehicle, and
the vehicle is being operated in an autonomous mode.

* * * * *